United States Patent
Shay

(10) Patent No.: US 7,233,433 B1
(45) Date of Patent: Jun. 19, 2007

(54) SELF-REFERENCE LOCKING OF OPTICAL COHERENCE BY SINGLE-DETECTOR ELECTRONIC-FREQUENCY TAGGING

(75) Inventor: Thomas M. Shay, Albuquerque, NM (US)

(73) Assignee: United States of America as Represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 11/465,884

(22) Filed: Aug. 21, 2006

Related U.S. Application Data

(62) Division of application No. 11/215,055, filed on Aug. 30, 2005.

(51) Int. Cl.
*H04S 4/00* (2006.01)
(52) U.S. Cl. .................. 359/349; 342/371; 342/372
(58) Field of Classification Search ............... 359/349; 342/371, 372
See application file for complete search history.

(56) References Cited

U.S. PATENT DOCUMENTS

| | | | | |
|---|---|---|---|---|
| 3,825,845 A | * | 7/1974 | Angelbeck et al. ......... | 359/349 |
| 5,440,576 A | * | 8/1995 | Welch et al. .............. | 372/50.22 |
| 5,717,516 A | * | 2/1998 | Klein et al. ................. | 359/334 |
| 5,832,006 A | * | 11/1998 | Rice et al. .................... | 372/3 |
| 5,847,816 A | * | 12/1998 | Zediker et al. ............ | 356/5.09 |
| 6,061,170 A | * | 5/2000 | Rice et al. .................. | 359/345 |
| 6,200,309 B1 | * | 3/2001 | Rice et al. ................... | 606/10 |
| 6,813,069 B2 | | 11/2004 | Rice et al. | |

OTHER PUBLICATIONS

J. Abderegg, S. J. Brosnan, M. E. Weber, H. Komine, and M. G. Wickham, "8-Watt Coherently-Phased 4-Element Fiber Array," Proceedings of the SPIE vol. 4974, pp. 1-6, 2003).

S.J. Augst, et al, "Coherent Beam Combining and Phase Noise Measurements of Yb fiber Amplifiers," Optics Letters, vol. 29, No. 5, pp. 474-476, Mar. 1, 2004.

* cited by examiner

*Primary Examiner*—Mark Hellner
*Assistant Examiner*—Eric Bolda
(74) *Attorney, Agent, or Firm*—Kenneth E. Callahan

(57) ABSTRACT

A coherent laser beam combining system wherein the output of a single master oscillator is split into a plurality of signals, the signals are electronically modulated at unique frequencies. One signal is designated a reference signal while the remaining signals are passed through phase adjusters. All signals are optically amplified, aligned and passed through a beam splitter to split off a small sample that is imaged onto a photodetector. The photodetector output is fed to a signal processor that produces phase error signals that drive the phase adjusters resulting in a high-powered optically coherent output signal.

5 Claims, 5 Drawing Sheets

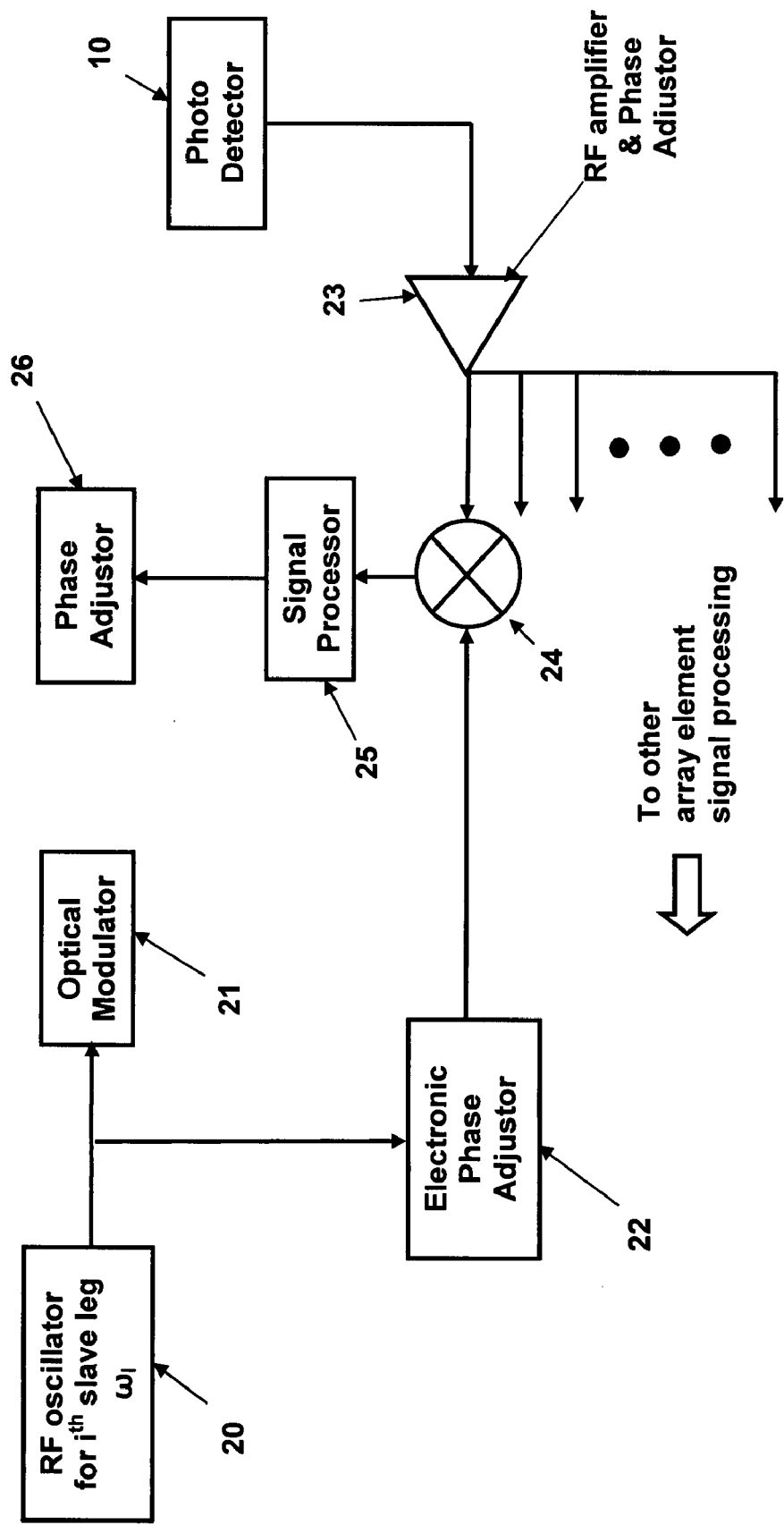
FIG. 2 – Reference element is unmodulated and the slave elements are phase modulated

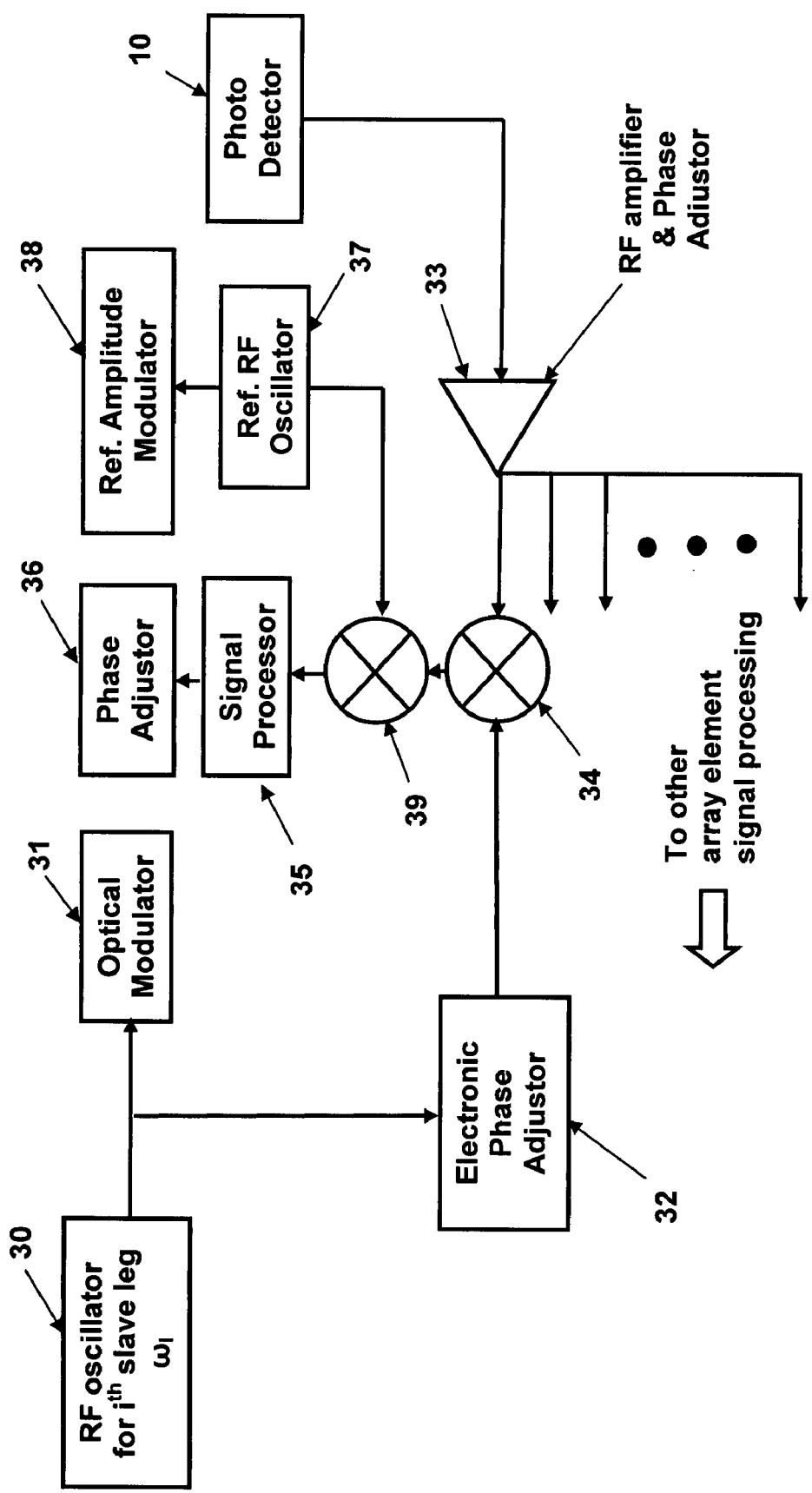
FIG. 3 - Reference element is amplitude modulated and the slave elements are phase modulated

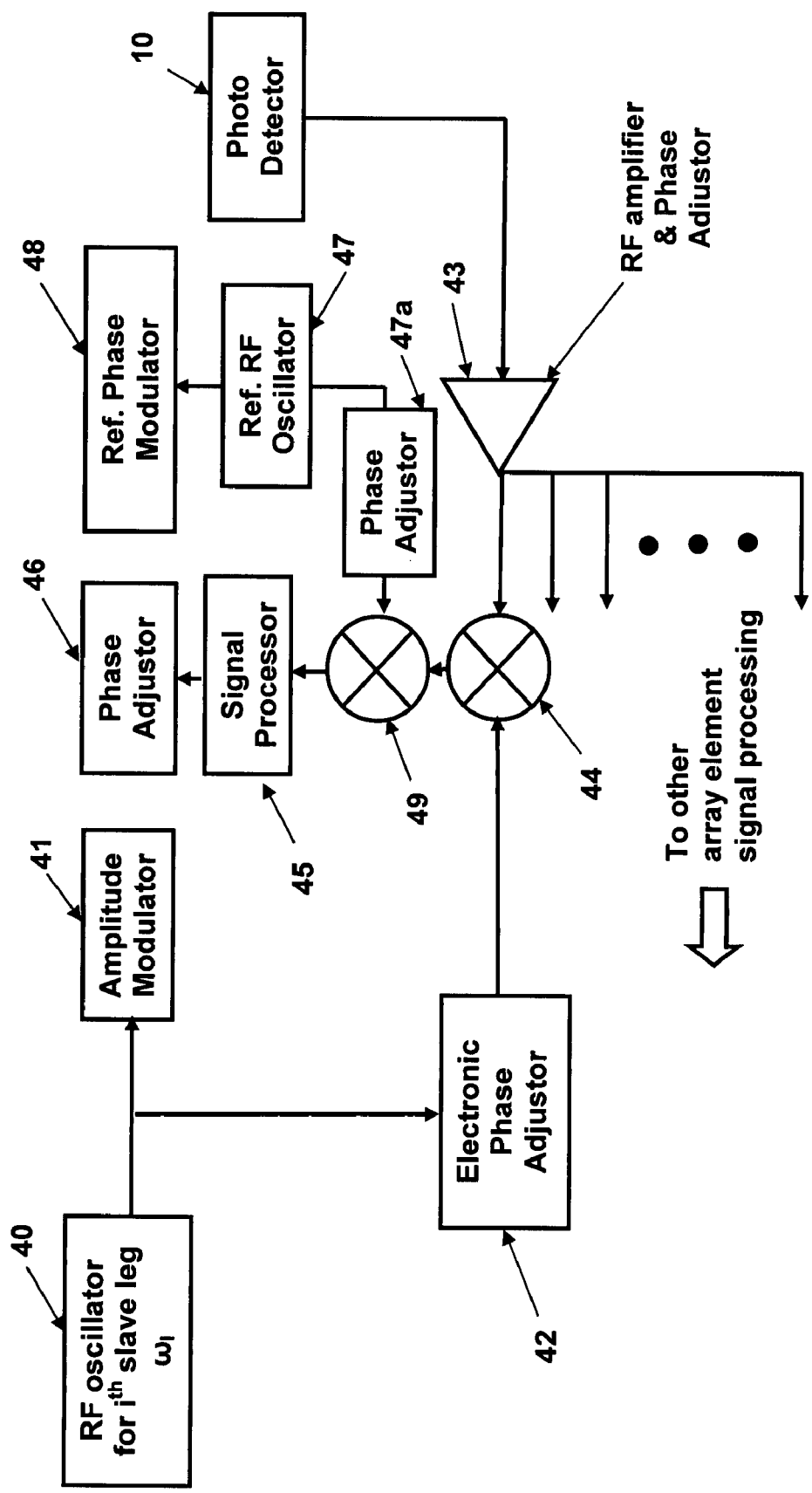
FIG. 4 - Reference element is phase modulated and the slave elements are amplitude modulated

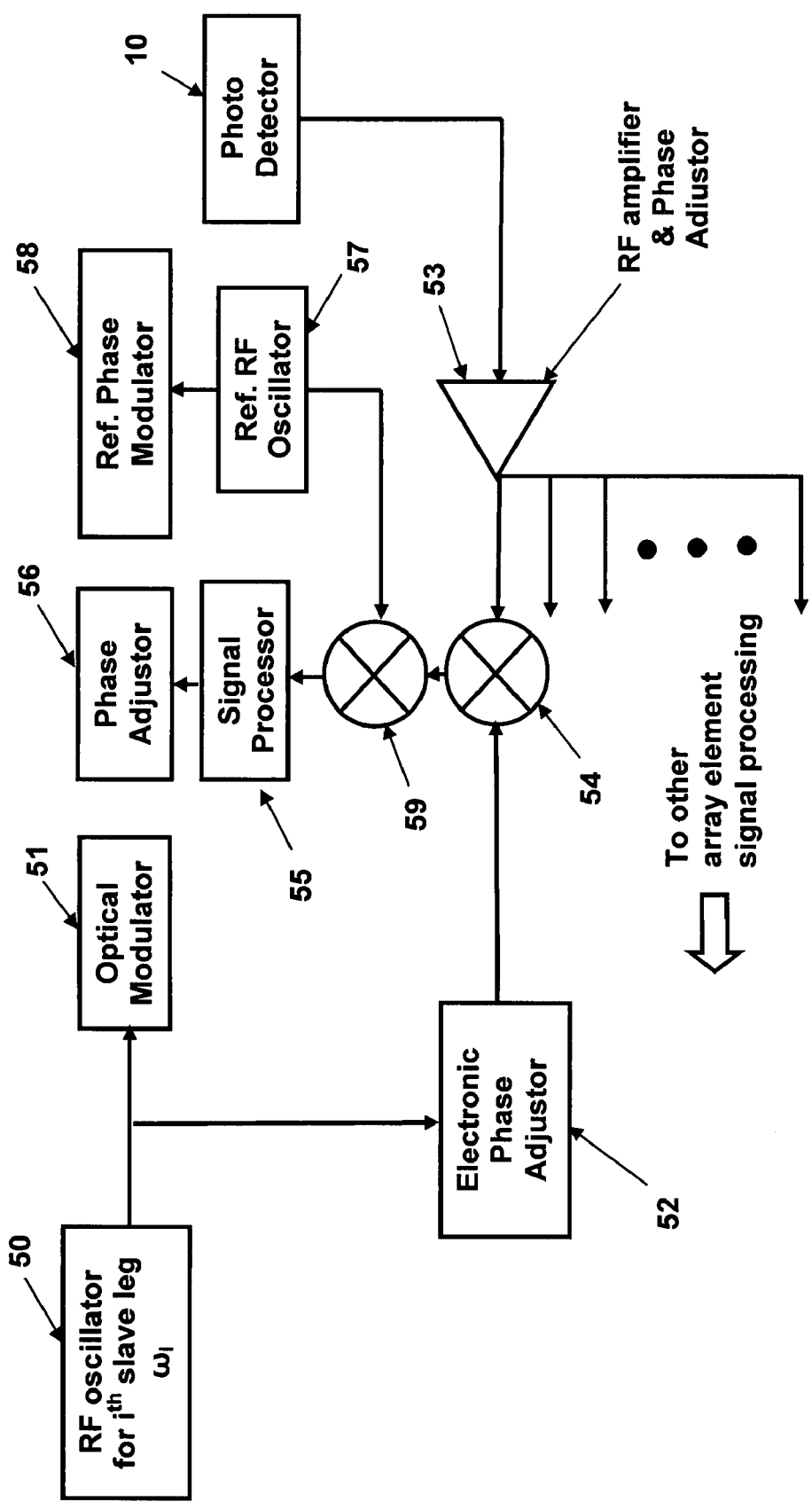
FIG. 5 - Both the reference leg and the slave legs are phase modulated.

SELF-REFERENCE LOCKING OF OPTICAL COHERENCE BY SINGLE-DETECTOR ELECTRONIC-FREQUENCY TAGGING

CROSS-REFERENCE TO RELATED APPLICATIONS

This application is a divisional and claims the benefit of the priority of prior application Ser. No. 11/215,055, filed Aug. 30, 2005, entitled "Self-Referenced Locking of Optical Coherence by Single-detector Electronic-Frequency Tagging."

STATEMENT OF GOVERNMENT INTEREST

The conditions under which this invention was made are such as to entitle the Government of the United States under paragraph I(a) of Executive Order 10096, as represented by the Secretary of the Air Force, to the entire right, title and interest therein, including foreign rights.

BACKGROUND OF THE INVENTION

The present invention relates generally to multiple element optical amplifier arrays used to achieve a high power beam and in particular, to a coherent beam combining system to facilitate such laser amplifier arrays.

The intensity and, hence, the power available from a single-mode optical fiber is limited by either optical surface damage or nonlinear optical effects. These limitations can be overcome by coherent beam-combining of the output power from multiple optical fibers. Fine control of the optical phase is required for any multi-fiber approach. In a master oscillator power amplifier (MOPA) configuration, the optical paths of each of the fibers have to be controlled to a fraction of the wavelength in order to coherently combine the individual outputs into a single, high-power beam. As a result of time varying thermal loads and other disturbances, an active feedback system is required to provide for both coherent addition and rapid slewing of the final beam direction There have been a number of experimental and theoretical research efforts directed toward developing a practical scheme for coherent beam combining. A number of researchers have implemented electronic phase locking that has demonstrated high fringe visibility for both passive (U.S. Pat. No. 6,813,069, "Method and apparatus for controlling a fiber optic phased array"+. and J. Abderegg, S. J. Brosnan, M. E. Weber, H. Komine, and M. G. Wickham, "8-Watt Coherently-Phased 4-Element Fiber Array," Proceedings of the SPIE vol. 4974, pp. 1–6, 2003) and active systems (S. J. Augst, T. Y. Fan, and Antonio Sanchez, "Coherent Beam Combining and Phase Noise Measurements of Yb fiber Amplifiers," Optics Letters, Vol. 29, No. 5, pp. 474–476, Mar. 1, 2004). In previous electronic phase locked fiber arrays, each leg of the array is modulated at the same RF frequency or alternatively the reference beam is the only beam modulated at an RF frequency. The light emerging from each leg is then interfered with the light from a reference leg. Because the same RF frequency is used to modulate each array leg, the light from each leg must be sent to spatially separate photodetectors. Good fringe visibilities of greater than 94 percent, and hence, very low phase errors were measured. However, Abderegg et. al. reported that the spatial alignment had stringent requirements even when the fiber-to-fiber spacing was 3-mm (J. Abderegg, S. J. Brosnan, M. E. Weber, H. Komine, and M. G. Wickham, "8-Watt Coherently-Phased 4-Element Fiber Array," Proceedings of the SPIE vol. 4974, pp. 1–6, 2003). For practical purposes, any array locking method must confine most of the array power into a single lobe. This in turn requires the use of a closely packed array. The closer the array elements are in a system using multiple photodetectors, the more stringent the spatial alignment tolerances required to ensure that there is no interference from adjacent array elements.

All systems to date have required one photodetector per array element leading to a more complex system and requiring great care be taken to ensure that the light from adjacent array elements is eliminated from the photodetector. To achieve the required spatial isolation a heavy optical platform is needed. The external reference beam also adds to the optical complexity and increases the size and weight of the optical platform. Clearly it would be advantageous to have a coherent beam combining system that used a single photodetector and needed no external reference beam.

SUMMARY OF THE INVENTION

The present invention is a unique coherent beam combining system for a laser amplifier array. In one embodiment, the output power of the signal from a single master oscillator is split by a 1 by N splitter and directed simultaneously into an array of the N optical modulators where each of the N signals is modulated by a unique electronic frequency. One of these modulated signals is selected as the reference signal. The modulation frequencies must be selected so that beat notes between the reference and other M element optical signals (N−1=M) can be uniquely isolated. The M modulated signals are fed to M phase adjusters and then optically amplified. The reference signal proceeds directly to an amplifier. A small portion of the array output is split off and imaged onto a photodetector. The photodetector output is fed to a signal processor that produces phase error signals that drive the M phase adjustors. The final output is thus a high-powered optically-coherent signal. Thus, a complex and difficult to implement spatial isolation of the phase error signals of previous systems is replaced with an easy to implement electronic isolation of the phase error signals between the reference signal and each of the M modulated optical signals. A single detector is used, and there is no separate reference beam. Furthermore, the method can easily be scaled to large numbers of array elements because the scaling is done in the electronic instead of the spatial domain.

BRIEF DESCRIPTION OF THE DRAWINGS

FIG. 2 is an electrical block diagram of the phase control loop for one of the block slave legs illustrating a first signal processing embodiment in which the slave legs are phase modulated and the reference beam is unmodulated.

FIG. 3 is an electrical block diagram of the phase control loop for one of the block slave legs illustrating a second signal processing embodiment in which the reference element is amplitude modulated and the slave elements are phase modulated.

FIG. 4 is the electrical block diagram of the phase control loop for one of the block slave legs illustrating a third signal processing embodiment in which the reference leg is phase modulated at frequency, $\Omega_r$, while the slave legs are amplitude modulated at frequencies, $\omega_i$, which are unique to each slave leg.

FIG. 5 is the electrical block diagram of the phase control loop for one of the block slave legs illustrating a fourth signal processing embodiment in which both the reference leg and the slave legs are phase modulated.

DESCRIPTION OF THE PREFERRED EMBODIMENT

Figure 1:
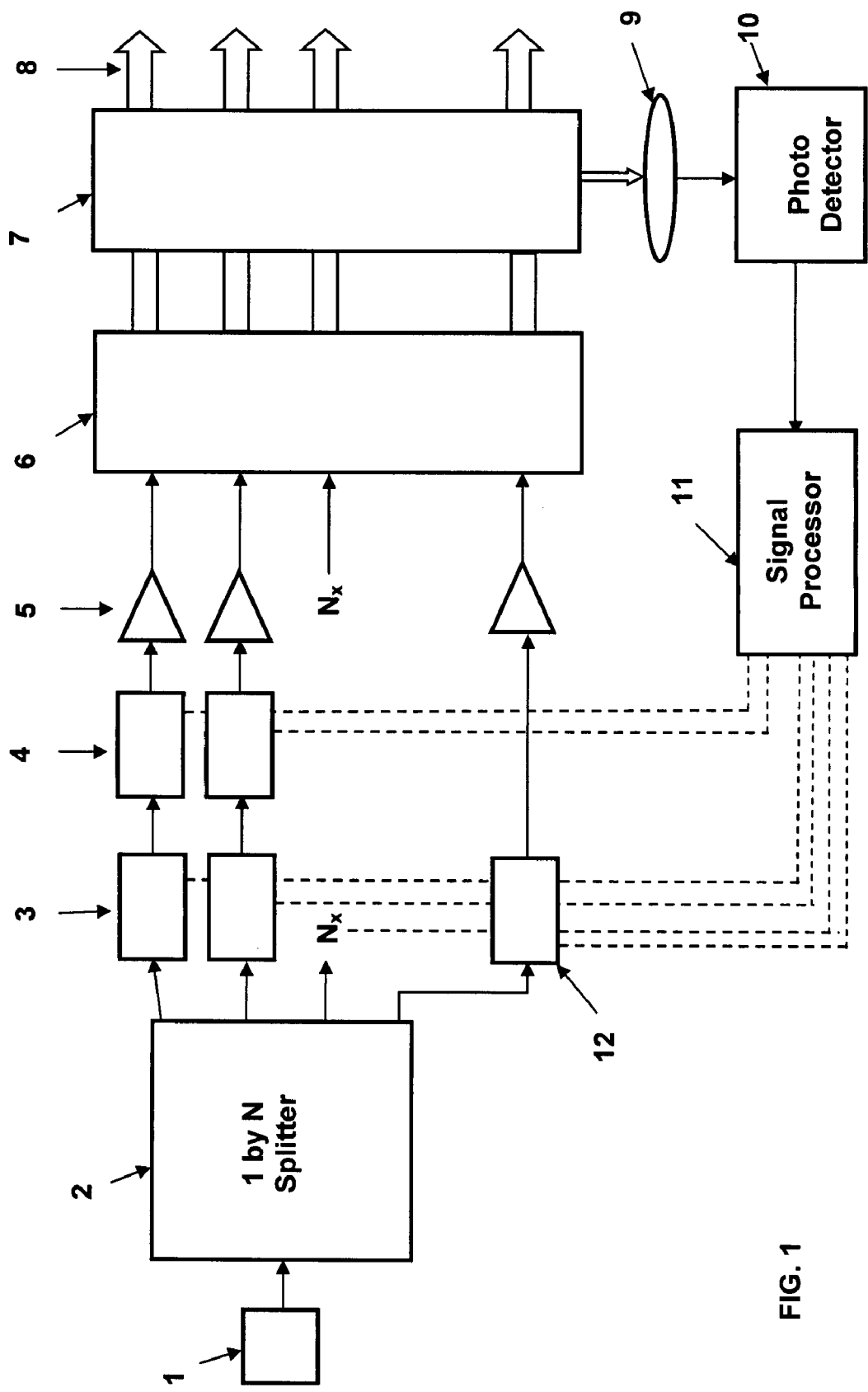
FIG. 1 is a block diagram of an embodiment of the present invention.

A novel coherent beam combining system is described that offers not only highly accurate and robust phase locking but is readily scalable to hundreds of elements. Furthermore, this method, called Self-Referenced LOCSET, provides a simple and robust method that needs only a single detector and uses one of the array elements as the reference leg, thus eliminating the need for a separate reference beam. This technology is applicable to general systems of laser amplifiers, i.e. semiconductor, bulk solid state, gas, dye, as well as fiber amplifiers.

A block diagram of an embodiment of the present invention is shown in FIG. 1. The diagram begins with a master oscillator 1. There may or may not be an optical amplifier incorporated in the master oscillator laser. The output power from the master oscillator divided by a 1×N power splitter 2. Each of the N output signals from the 1×N power splitter 2 is then directed to N optical modulators 3 where each of the N signals is modulated by a unique electronic frequency. One of these modulated signals 12 is selected as the reference signal; the remaining M=N−1 modulated signals are referred to as slave signals. The modulation frequencies must be selected so that beat notes between the reference and the other M element optical signals can be uniquely isolated. The M slave signals are fed to M phase adjusters 4 and then to optical amplifiers 5. The reference signal 12 proceeds directly to an optical amplifier. The optical modulators 3 and the optical phase adjusting elements 4 can be separate devices, or they may be single devices that perform both tasks. In principle the order of amplification does not matter. In practice power handling capabilities of some of the optical elements will determine if it is advantageous to perform modulation at lower powers. The outputs from the optical amplifiers 5 are then directed to the array output optics 6. The relative position of the optical amplifiers 5 and optical modulators 3 and phase adjusters 4 are in principle arbitrary. However, practical details such as power handling capability of individual elements, system noise characteristics, or even reduction of the modulation effectiveness by succeeding elements may lead to a preferred sequence of optical elements.

Next the N amplified outputs are optically co-aligned in the alignment optics 6 and, the output is directed to the beam sampler 7. In a variation of this embodiment, the beams may be sampled before the alignment optics. In that case the beam sampler 7 may precede the co-alignment optics 6. While the majority of the power passes through the beam splitter 7 and constitutes the array output 8, a small fraction of the array output is directed to the far field imaging optics 9 and then on to the photodetector 10. The imaging system 9 is used to image a far-field central spot onto the photodetector 10 that fills or overfills the active area of the photodetector 10. The signal-to-noise ratio for a given optical power in the sampled beam is optimized if only the central lobe of the far field is imaged onto the photodetector. However, this is not a necessary condition for achieving accurate phase control. Excellent phase locking can be achieved when the central lobe overfills or underfills the photodetector active area. It is only necessary that there be a sufficient signal-to-noise ratio for phase locking.

The electrical signals from the photodetector 10 are signal processed 11 to isolate and extract the phase control signals for each optical array (slave) element, and the phase control signals are then applied to the phase adjusting elements 4 using negative feedback to cancel the phase difference between the array (slave) elements and the reference element 12. Optimum performance is obtained when the array elements are all traveling in the same direction with the same divergence. However, the optimum condition is not required for excellent phase control to be demonstrated.

The theoretical basis for the signal processing 11 will be presented first and then four embodiments of the signal processing will be presented. Consider an optical array with M+1 separate array legs (M slave legs and 1 reference leg). There are several embodiments that can be employed to realize an optical phase locked array that uses an array element as the reference element. Four embodiments for signal processing will be presented. The common features of all four embodiments are: 1) the optical fields from the M+1 array elements are all superimposed on a single photodetector; 2) each slave leg has a small RF phase modulation at a distinct RF frequency; 3) electronic signal processing is then applied to extract the amplitude of a beat note signal for each slave leg that is proportional to the sine of the phase error between the reference leg and each individual slave leg; and 4) the amplitude of that signal is then processed and applied to correct the phase errors of the M individual slave legs.

Description of the First Signal Processing Embodiment

FIG. 2 illustrates the signal processing for the first of the four embodiments, i.e., the case where the slave legs are phase modulated and the reference beam is unmodulated. (This is the signal processor 11 in FIG. 1.) FIG. 2 is the electrical block diagram of the phase control loop for one of the M block slave legs. Each slave leg has an RF oscillator 20 that operates at a frequency, $\omega_i$, which is unique to that slave leg. The RF oscillator 20 performs two functions. It drives the phase modulator 21 for that slave leg to provide a small RF phase modulation, and it provides an RF signal that is used to extract the phase error term for that slave leg from the photodetector 10 signal. An optional phase adjustor 22 is also shown in FIG. 2 that can compensate for phase shifts due to cable lengths. The photodetector 10 has the electrical signals from all of the interfering optical fields incident upon it. An optional electronic amplifier and power splitter 23 is shown in the FIG. 2. The signal from the photodetector is sampled by all M of the signal processing legs, and the phase error signal for each slave leg is extracted by the following signal processing steps. The signal from the RF oscillator 20 is mixed with the photocurrent signal in the RF mixer 24. The output of the RF mixer 24 is processed in the signal processor 25. The signal processing consists of 1) integrating the output of the RF mixer 24 to filter out the signals from the other slave legs and extract the phase error signal amplitude that is proportional to $\mathrm{Sin}(\phi_r-\phi_i)$, 2) amplifying and phase shifting this signal to provide the stable negative feedback conditions necessary for phase control operation, and 3) supplying electronics to reset the phase shifter modulo $2\pi$. The output of the signal processing electronics is applied to the optical phase adjuster 26 (4 of FIG. 1). Note that the phase adjuster 26 and the phase modulator 21 may be combined into a single element.

In this first embodiment the phase error signal is, $$S_{rii} = R_{PD} \cdot \sqrt{P_i} \cdot J_1(\beta_i) \left( \sqrt{P_r} \cdot \text{Sin}(\phi_r - \phi_i) + \frac{1}{4} \cdot \sum_{j=1}^{M} \sqrt{P_j} \cdot J_0(\beta_j) \cdot \text{Sin}(\phi_r - \phi_i + \delta\phi_{jr}) \right) \quad \text{Eq. 1}$$

where $R_{PD}$ represents the responsivity of the photodetector, $P_i$ represents the power in the phase element that is being locked by this control loop, $P_j$ represents the power in the other slave elements, $P_r$ represents the power in the reference element, M represents the number of slave elements in the array, $J_{1,0}$ represent the Bessel function of the first kind of order 1 and 0, respectively. $\beta_{i,j}$ represents the phase modulation amplitudes of the phase element that is being locked (i) and the other slave elements (j), respectively. $\phi_r$ represents the optical phase of the reference element. $\phi_i$ and $\phi_j$ represent the optical phases of the $i^{th}$ and $j^{th}$ slave element, respectively. $\delta\phi_{jr}$ represents the phase error between the $j^{th}$ array element and the reference element. M+1=N is the number of elements in the array.

The first term in the parenthesis on the right-hand-side of Eq. 1 is due to the optical phase difference between the $i^{th}$ slave element and the reference element, while the second term in the parenthesis is due to the phase error between the $j^{th}$ slave element and the $i^{th}$ slave element. When all slave elements are phase locked this second term increases the strength of the feedback, improving the phase locking operation. However, in the case where one leg is unlocked or poorly locked, then this term will lead to a decrease in the strength of the feedback. If a single element becomes unlocked the easiest means of mitigating the effects of the second term is to sense the element that is unstable and reduce the power to the optical amplifier in that leg so that the optical field strength from that element is insignificant compared to the field strengths of the other elements.

Description of the Second Signal Processing Embodiment

The three remaining embodiments incorporate signal processing methods that eliminate phase error signal contributions due to the phase difference between slave leg (i) and slave legs (j) providing that the modulation frequencies and amplitudes are properly selected. FIG. 3 illustrates the signal processing for the second of the four embodiments. FIG. 3 is the electrical block diagram of the phase control loop for one of the block slave legs. In this embodiment the reference leg is amplitude modulated at frequency, $\Omega_r$, while the slave legs are phase modulated at frequencies, $\omega_i$, which are unique to each slave leg.

The reference leg is amplitude modulated at the frequency of the reference RF oscillator 37, $\Omega_r$, that is, it drives the reference leg amplitude modulator 38 and RF oscillator 37 also provides an RF signal that extracts the phase error term from for that slave leg from the photocurrent. Each slave leg has an RF oscillator 30 that operates at a frequency that is unique to that slave leg. The RF oscillator 30 performs two functions. It drives the phase modulator 31 for that slave leg to provide a small RF phase modulation, and it provides an RF signal that is used to extract the phase error term for that slave leg from the photodetector 10 signal. An optional phase adjustor 32 is also shown in FIG. 3. It can compensate for phase shifts due to electronic and fiber cable lengths as well as phase shifts in the electronic elements. The photodetector 10 has the electrical signals from all of the interfering optical fields incident upon it. An optional electronic amplifier and power splitter 33 is shown in the FIG. 3. The signal from the photodetector 10 is sampled by all M of the signal processing legs.

The phase error signal for each slave leg is extracted by the following signal processing steps. The signal from the $i^{th}$ slave leg RF oscillator 20 is mixed with the photodetector signal in the RF mixer 34. The output of the RF mixer 34 is mixed with the reference leg RF oscillator 37 signal in mixer 39. The output of mixer 39 is signal processed 35. The signal processing consists of: 1) integrating the output of the mixer 39 to filter out the signals from the other slave legs and extract the phase error signal amplitude that is proportional to $\text{Sin}(\phi_r - \phi_i)$; 2) amplifying and phase shifting this signal to provide the stable negative feedback conditions necessary for phase control operation; and 3) supplying electronics to reset the phase shifter modulo $2\pi$. The output of the signal processing electronics 35 is applied to the optical phase adjuster 36. Note that the phase adjuster 36 and the phase modulator 31 may be combined into a single element.

The phase error control signal is proportional to, $$S_{rii} = \frac{R_{PD}}{2} \sqrt{P_r \cdot P_i} \cdot \delta m \cdot J_1(\beta_i) \cdot \text{Sin}(\phi_i - \phi_r) \quad \text{Eq. 2}$$

where $R_{PD}$ represents the photodetector responsivity of the photodetector, $\delta m$ represents the field amplitude modulation amplitude, $J_1$ represents a Bessel function of the first kind of order 1, $\beta_i$ represents the phase modulation amplitude for the $i^{th}$ slave leg, $\phi_i$ represents the optical phase of the $i^{th}$ slave leg, $\phi_r$ represents the optical phase of the reference leg, and finally, $P_i$ and $P_r$ represent the optical powers of the $i^{th}$ slave leg and the reference leg that are incident upon the photodetector. Eq. 2 is the demodulated signal due to the interference between the reference field and the $i^{th}$ slave field. The difference between the slave leg frequencies must be large enough so that the dominant signal that is being transmitted through the signal processor 35 is due to that slave leg. Furthermore, the order of application of the RF oscillator's signals 30 and 37 can be interchanged without affecting the signal processing. An equivalent result is also obtained when the RF oscillator signals are mixed with each other and then mixed with the photodetector 10 signals.

In addition, the photodetector current has two other terms; the photocurrent due to the reference field interfering with itself and the photocurrent due to the $i^{th}$ slave field interfering with the all of the slave fields. The photocurrent due to the reference current itself can be neglected providing that the following inequalities are valid, $$|\omega_i - \Omega_r| \geq \Delta\omega_{SP} \text{ and } |\omega_i - 3 \cdot \Omega_r| \geq \Delta\omega_{SP} \quad \text{Eq. 3}$$

where $\Delta\omega_{SP}$ represents the frequency mismatch required for the signal processing system to filter out any interfering beat note signals. Eq. 3 must be true for all i of the slave leg frequencies, $\omega_i$, for the system to reliably control all of the slave leg phases. The photocurrent due to the interference between the slave legs can be neglected providing that, $$|S_{rii}| >> |S_{ijk}| \quad \text{Eq. 4}$$

where $S_{rii}$ represents the value of the error control signal set by the specified minimum phase error required for the system and $S_{ijk}$ represents the demodulated photocurrent due to the $i^{th}$ slave leg field interfering with all of the slave leg fields.

$$S_{ijk} = \frac{R_{PD}}{2 \cdot \tau} \int_0^\tau \left\{ \left[ \sum_{i=1}^N \sqrt{P_i} \cdot \sum_{j=1}^N \sqrt{P_j} \left[ \begin{array}{l} \cos(\phi_i - \phi_j) \cdot \left( \begin{array}{l} J_0(\beta_j) \cdot \sum_{n_i=1}^\infty J_{2n_i}(\beta_i) \cdot \cos(2 \cdot n_i \cdot \omega_i \cdot t) + \\ J_0(\beta_i) \cdot \sum_{n_j=1}^\infty J_{2n_j}(\beta_j) \cdot \cos(2 \cdot n_j \cdot \omega_j \cdot t) \end{array} \right) + \\ \cos(\phi_i - \phi_j) \sum_{n_i=1}^\infty \sum_{n_j=1}^\infty J_{2n_i}(\beta_i) \cdot J_{2n_j}(\beta_j) \cdot \\ ((\cos[(2 \cdot n_i \cdot \omega_i - 2 \cdot n_j \cdot \omega_j) \cdot t]) + \cos[(2 \cdot n_i \cdot \omega_i + 2 \cdot n_j \cdot \omega_j) \cdot t]) + \\ \cos(\phi_i - \phi_j) \cdot \sum_{n_i=1}^\infty \sum_{n_j=1}^\infty J_{2n_j-1}(\beta_j) \cdot J_{2n_i-1}(\beta_i) \cdot \\ \left( \begin{array}{l} \cos[((2 \cdot n_i - 1) \cdot \omega_i - (2 \cdot n_j - 1) \cdot \omega_j) \cdot t] - \\ \cos[((2 \cdot n_i - 1) \cdot \omega_i + (2 \cdot n_j - 1) \cdot \omega_j) \cdot t] \end{array} \right) \end{array} \right] \right] \right\} \cdot (\cos((\omega_k - \Omega_r) \cdot t) - \cos((\omega_k + \Omega_r) \cdot t)) \cdot dt,$$

Eq. 5 where the index k is the index for the slave frequency that is driving one of the demodulators for an array element control loop, $\beta_j$ represents the phase modulation amplitude for the $j^{th}$ slave leg, $\omega_j$ represents the phase modulation frequency for the $j^{th}$ slave leg, $n_i$ and $n_j$ represent the summation index for the Bessel function sums and M represents the number of slave legs. In the system design the phase modulation amplitudes, $\beta_i$'s, the slave modulation frequencies, $\omega_i$'s, and the reference frequency can be selected to ensure stable phase locking of the array.

Description of the Third Signal Processing Embodiment

FIG. 4 illustrates the signal processing for the third of the four embodiments that will be presented. FIG. 4 is the electrical block diagram of the phase control loop for one of the block slave legs. In this embodiment the reference leg is phase modulated at frequency, $\Omega_r$, while the slave legs are amplitude modulated at frequencies, $\omega_i$, which are unique to each slave leg. The reference leg is phase modulated at the frequency of the reference RF oscillator 47, $\Omega_r$, that is, drives the reference leg phase modulator 48 and RF oscillator 47 also provides an RF signal that extracts the phase error term from that slave leg from the photocurrent. Optional phase adjuster 47a may be used to compensate for phase shifts due to electronic and fiber cable lengths as well as phase shifts in the electronic elements. Each slave leg has an RF oscillator 40 that operates at a frequency that is unique to that slave leg. The RF oscillator 40 performs two functions, 1) it drives the amplitude modulator 41 for that slave leg to provide a small RF phase modulation and 2) it provides an RF signal that is used to extract the phase error term for that slave leg from the photocurrent signal. An optional phase adjustor 44 is also shown in FIG. 4. The photodetector 10 has the electrical signals from all of the interfering optical fields incident upon it. An optional electronic amplifier and power splitter 43 is also shown in the FIG. 4. The signal from the photodetector is sampled by all M of the signal processing legs and the phase error signal for each slave leg is extracted by the following signal processing steps. The signal from the $i^{th}$ slave leg RF oscillator 40 is mixed with the photocurrent signal in the RF mixer 44. The output of the RF mixer 44 is mixed with the reference leg RF oscillator 47 signal in mixer 49. The output of mixer 49 is signal processed 45. The signal processing consists of: 1) integrating the output of the mixer 49 to filter out the signals from the other slave legs and extract the phase error signal amplitude that is proportional to $\sin(\phi_r - \phi_i)$; 2) amplifying and phase shifting this signal to provide the stable negative feedback conditions necessary for phase control operation; and 3) supplying electronics to reset the phase shifter modulo $2\pi$. The output of the signal processing electronics is applied to the optical phase adjuster 46. Note that the phase adjuster 46 and the phase modulator 48 may be combined into a single element. The phase error control signal is, $$S_{rii} = \frac{-R_{PD}}{2} \sqrt{P_r \cdot P_i} \cdot \delta m_i \cdot J_1(\beta_r) \cdot \sin(\phi_i - \phi_r)$$

Eq. 6 where $R_{PD}$ represents the photodetector responsivity of the photodetector, $\delta m_i$ represents the field amplitude modulation amplitude for the $i^{th}$ slave leg, $\beta_r$ represents the phase modulation amplitude for the reference leg, $\phi_i$ represents the optical phase of the $i^{th}$ slave leg, $\phi_r$ represents the optical phase of the reference leg, and finally, $P_i$ and $P_r$ represent the optical powers of the $i^{th}$ slave leg and the reference leg that are incident upon the photodetector. Eq. 6 is the demodulated signal due to the interference between the reference field and the $i^{th}$ slave field. It is quite clear that the difference between the slave leg frequencies must be large enough so that the dominant signal being transmitted through the signal processor is due to that slave leg. Furthermore, the order of application of the RF oscillator's signals 40 and 47 can be interchanged without affecting the signal processing. An equivalent result is also obtained when the RF oscillator signals are mixed with each other and then mixed with the photocurrent signal.

The slave and reference RF frequencies must be selected so that the following inequality is satisfied, $$|S_{rii}| \gg$$

$$|S_{ijk}| = \frac{1}{\tau} \int_0^\tau i_{ij}(t) \cdot \frac{1}{2} (\cos((\omega_k - \Omega_r) \cdot t) - \cos((\omega_k + \Omega_r) \cdot t)) \cdot dt.$$

Eq. 7 where the index k is the index for the slave frequency that is driving one of the demodulators for an array element control loop, $\tau$ represents the integration time of the control loop, and $i_{ij}(t)$ represents the photocurrent due to the slave element fields interfering with each other, $$i_{ij}(t) = \frac{R_{PD}}{2} \cdot \sum_{i=1}^{N} \sqrt{P_i} \cdot \sum_{j=1}^{N} \sqrt{P_j} \left[ \begin{array}{l} \cos(\phi_i - \phi_j) \cdot \\ \left( \begin{array}{l} 1 + \delta m_i \cdot \sin(\omega_i \cdot t) + \delta m_j \cdot \sin(\omega_j \cdot t) + \\ \left\{ \frac{\delta m_i \cdot \delta m_j}{2} (\cos([\omega_i - \omega_j] \cdot t) - \cos([\omega_i + \omega_j] \cdot t)) \right\} \end{array} \right) \end{array} \right].$$

Eq. 8

In the system design the phase modulation amplitudes, $\beta_i$'s, the slave modulation frequencies, $\omega_i$'s, and the reference frequency can be selected to ensure stable phase locking of the array.

Description of the Fourth Signal Processing Embodiment

FIG. 5 illustrates the signal processing for the fourth of the four embodiments. FIG. 5 is the electrical block diagram of the phase control loop for one of the block slave legs. In this embodiment both the reference leg and the slave legs are phase modulated. The reference leg is modulated at frequency, $\Omega_r$, while the slave legs are phase modulated at frequencies, $\omega_i$, which are unique to each slave leg. The reference leg is phase modulated at the frequency of the reference RF oscillator 57, $\Omega_r$, that is it drives the reference leg phase modulator 58 and RF oscillator 57 also provides an RF signal that extracts the phase error term from for that slave leg from the photocurrent. Each slave leg has an RF oscillator 50 that operates at a frequency that is unique to that slave leg. The RF oscillator 50 performs two functions: 1) it drives the phase modulator 51 for that slave leg to provide a small RF phase modulation and 2) it provides an RF signal that is used to extract the phase error term for that slave leg from the photocurrent signal. The RF oscillator 57 performs two functions: 1) it drives the phase modulator 58 for that reference leg to provide a small RF phase modulation and 2) it provides an RF signal that is used to extract the phase error term for that slave leg from the photocurrent signal. An optional phase adjustor 52 is also shown in FIG. 5. The photodetector 10 has the electrical signals from all of the interfering optical fields incident upon it. An optional electronic amplifier and power splitter 53 is shown in the FIG. 5. The signal from the photodetector is sampled by all M of the signal processing legs and the phase error signal for each slave leg is extracted by the following signal processing steps. The signal from the $i^{th}$ slave leg RF oscillator 50 is mixed with the photocurrent signal in the RF mixer 54. The output of the RF mixer 54 is mixed with the reference leg RF oscillator 57 signal in mixer 59. The output of mixer 59 is signal processed 55. The signal processing consists of 1) integrating the output of the mixer 59 to filter out the signals from the other slave legs and extract the phase error signal amplitude that is proportional to $\sin(\phi_r - \phi_i)$, 2) amplifying and phase shifting this signal to provide the stable negative feedback conditions necessary for phase control operation, and 3) supplying electronics to reset the phase shifter modulo $2\pi$. The output of the signal processing electronics is applied to the optical phase adjuster 56. Note that the phase adjuster 56 and the phase modulator 51 may be combined into a single element. The phase error control signal is, $$S_{rii} = \frac{-R_{PD}}{2} \sqrt{P_r \cdot P_i} \cdot J_1(\beta_i) \cdot J_1(\beta_r) \cdot \sin(\phi_i - \phi_r)$$

Eq. 9 where $R_{PD}$ represents the photodetector responsivity of the photodetector, $\delta m_i$ represents the field amplitude modulation amplitude for the $i^{th}$ slave leg, $\beta_r$ represents the phase modulation amplitude for the reference leg, $\phi_i$ represents the optical phase of the $i^{th}$ slave leg, $\phi_r$ represents the optical phase of the reference leg, and finally, $P_i$ and $P_r$ represent the optical powers of the $i^{th}$ slave leg and the reference leg that are incident upon the photodetector. Eq. 9 is the demodulated signal due to the interference between the reference field and the $i^{th}$ slave field. It is quite clear that the difference between the slave leg frequencies must be large enough so that the dominant signal being transmitted through the signal processing is due to that slave leg. Furthermore, the order of application of the RF oscillator's signals 50 and 57 can be interchanged without effecting the signal processing. An equivalent result is also obtained when the RF oscillator signals are mixed with each other and then mixed with the photocurrent signal.

The slave and reference RF frequencies must be selected so that the following inequality is satisfied, $$|S_{rii}| \gg |S_{ijk}| = \frac{1}{\tau} \int_0^\tau i_{ij}(t) \cdot \frac{1}{2} (\cos((\omega_k - \Omega_r) \cdot t) -$$

Eq. 10

$$\cos((\omega_k + \Omega_r) \cdot t)) \cdot dt$$

$$|S_{rii}| \gg |C_{ijk}| = \frac{1}{\tau} \int_0^\tau i_{ij\_cos}(t) \cdot \frac{1}{2} (\cos((\omega_k - \Omega_r) \cdot t) -$$

$$\cos((\omega_k + \Omega_r) \cdot t)) \cdot dt,$$

where the index k is the index for the slave frequency that is driving one of the demodulators for an array element control loop, $\tau$ represents the integration time of the control loop, $i_{ij}(t)$ represents the photocurrent due to the slave element fields interfering with each other, and $i_{ij\_cos}(t)$ represents the portion of the photocurrent due to the reference field beating with the slave legs that is proportional to the $\cos(\phi_i - \phi_r)$, this can be eliminated because those signals beat at a different frequencies from the beat notes of the term proportional to $\sin(\phi_i - \phi_r)$, that constitutes the phase control error signal. In addition, keeping the phase modulation amplitudes small reduces the number of harmonics that need to be considered.

$$i_{ij}(t) = \frac{R_{PD}}{2} \cdot \sum_{l=1}^{N} \sqrt{P_l} \cdot$$

Eq. 11

$$\sum_{j=1}^{N} \sqrt{P_j} \begin{bmatrix} \left\{ \begin{array}{l} (\cos(\phi_l - \phi_j) + \cos(2 \cdot \omega_L \cdot t + \phi_l + \phi_j)) \\ (\cos(\beta_l \cdot \sin(\omega_l \cdot t))\cos(\beta_j \cdot \sin(\omega_j \cdot t))) \end{array} \right\} - \\ \left\{ \begin{array}{l} (\sin(\phi_l - \phi_j) + \sin(2 \cdot \omega_L \cdot t + \phi_l + \phi_j)) \\ (\sin(\beta_l \cdot \sin(\omega_l \cdot t))\cos(\beta_j \cdot \sin(\omega_j \cdot t))) \end{array} \right\} - \\ \left\{ \begin{array}{l} (-\sin(\phi_l - \phi_j) + \sin(2 \cdot \omega_L \cdot t + \phi_l + \phi_j)) \\ (\cos(\beta_l \cdot \sin(\omega_l \cdot t))\sin(\beta_j \cdot \sin(\omega_j \cdot t))) \end{array} \right\} + \\ \left\{ \begin{array}{l} (\cos(\phi_l - \phi_j) - \cos(2 \cdot \omega_L \cdot t + \phi_l + \phi_j)) \\ (\sin(\beta_l \cdot \sin(\omega_l \cdot t))\sin(\beta_j \cdot \sin(\omega_j \cdot t))) \end{array} \right\} \end{bmatrix}.$$

In the system design the phase modulation amplitudes, $\beta_i$'s, the slave modulation frequencies, $\omega_i$'s, and the reference frequency can be selected to ensure stable phase locking of the array.

In principle the phase error signal can be extracted by demodulating the photodetector signal with any odd harmonic of the impressed modulations. However, this requires the addition of one or more frequency multipliers in the block diagrams and the phase error signal will then generally be much lower than the phase error signals obtained by demodulation at the fundamental frequencies. Therefore, demodulation by the fundamental modulation frequencies is considered the preferred method.

The use of a single photodetector eliminates the need for very careful spatial aligning of the photodetector arrays and array beams. The technique also eliminates the need for a complicated and expensive reference beam that is required for all of the other multiple beam phase locking techniques. In the Self-Referenced LOCSET system, one of the array elements is used as a reference beam reducing significantly the system complexity compared to the other phase locking techniques.

In embodiments two, three, and four, the failure of a single leg to lock does not affect the locking fidelity of the other legs. For the first embodiment the failure of a single leg to lock may degrade the locking accuracy of the other legs. Prudent design using the first embodiment requires monitoring the locking accuracy of the legs and a control loop for turning off either the power or the modulation to the leg that isn't properly locking. This need is eliminated in embodiments two, three and four.

The invention claimed is:

1. A method of implementing a coherent laser beam combining system, the method comprising:
   a. splitting the output signal of a master oscillator into N signals;
   b. simultaneously modulating each of said N signals at a unique frequency;
   c. selecting one of said N modulated signals as a reference signal, thereafter designing the remaining M=N−1 signals as M slave signals;
   d. feeding said M slave signals to M optical phase adjusters;
   e. optically amplifying the output of said M phase adjusters and said reference signal;
   f. feeding said N amplified signals to alignment optics;
   g. feeding the N output signals of said alignment optics to a beam sampler, wherein a small portion of the alignment optics output signals is split off and imaged onto a photodetector and the remainder of the alignment optics output signals are passed through the beam sampler and become the final output;
   h. directing an output signal of said photodetector to a signal processor that produces phase error signals to drive each of the M optical phase adjusters, whereby the M phase adjusted signals are maintained in phase with the reference signal producing a high-powered optically-coherent final output signal.

2. The method of implementing a coherent laser beam combining system of claim 1, wherein modulating each of said N signals is accomplished by not modulating said reference signal and by phase modulating said M slave signals at unique electronic frequencies.

3. The method of implementing a coherent laser beam combining system of claim 1, wherein modulating each of said N signals is accomplished by amplitude modulating said reference signal and by phase modulating said M slave signals at unique electronic frequencies.

4. The method of implementing a coherent laser beam combining system of claim 1, wherein modulating each of said N signals is accomplished by phase modulating said reference signal and by amplitude modulating said M slave signals at unique electronic frequencies.

5. The method of implementing a coherent laser beam combining system of claim 1, wherein modulating each of said N signals is accomplished by phase modulating said reference signal and said M slave signals at unique electronic frequencies.

\* \* \* \* \*